United States Patent [19]

Dechene et al.

[11] Patent Number: 4,904,944
[45] Date of Patent: Feb. 27, 1990

[54] FLOW MEASURING APPARATUS WITH ANALOG, ESSENTIALLY LINEAR OUTPUT

[75] Inventors: Ronald L. Dechene, Boxford; Robert E. Newton, Tewksbury, both of Mass.

[73] Assignee: Auburn International, Inc., Danvers, Mass.

[21] Appl. No.: 135,661

[22] Filed: Dec. 21, 1987

Related U.S. Application Data

[63] Continuation-in-part of Ser. No. 658,587, Oct. 9, 1984, Pat. No. 4,714,890.

[51] Int. Cl.⁴ ............................................. G01R 27/60
[52] U.S. Cl. ................................. 324/454; 73/861.08; 324/72; 324/71.1
[58] Field of Search .............. 324/454, 453, 464, 71.1, 324/71.3, 72, 72.5, 452, 457, 458; 73/861.08

[56] References Cited

U.S. PATENT DOCUMENTS

| | | | |
|---|---|---|---|
| 3,857,066 | 12/1974 | Cline et al. | 324/454 X |
| 4,480,484 | 11/1984 | Ueyama | 73/861.08 |
| 4,512,200 | 4/1985 | Ghering et al. | 73/861.08 X |
| 4,531,402 | 12/1985 | Reif et al. | 324/464 X |
| 4,607,228 | 8/1986 | Reif | 324/454 |
| 4,714,890 | 12/1987 | Dechene et al. | 324/71.1 X |

Primary Examiner—Reinhard J. Eisenzopf
Assistant Examiner—Robert W. Mueller
Attorney, Agent, or Firm—Jerry Cohen

[57] ABSTRACT

Flow measuring apparatus comprising a probe (1) coupled via a coaxial cable (2) to control circuitry with a current to voltage convertor (10), absolute value circuit (12), auto zero switch and integration (11, 27) and voltage to current circuit (18) yielding an analog output, corresponding to flow at the probe.

1 Claim, 3 Drawing Sheets

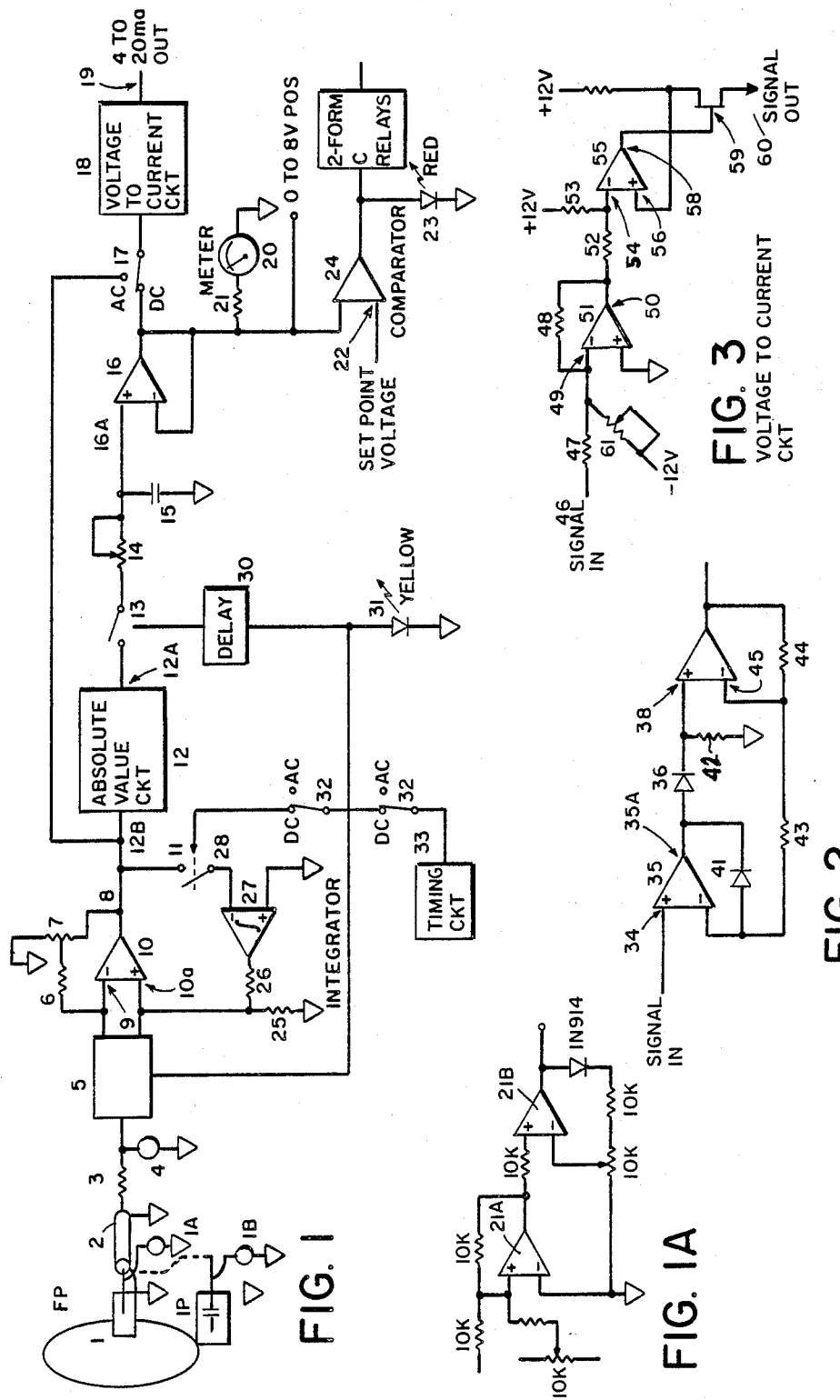

FLOW MEASURING APPARATUS WITH ANALOG, ESSENTIALLY LINEAR OUTPUT

CROSS REFERENCE TO RELATED APPLICATION

This application is a continuation in part of Ser. No. 658,587, filed Oct. 9, 1984 and now U.S. Pat. No. 4,714,890, granted Dec. 22, 1987.

BACKGROUND OF THE INVENTION

The present invention relates to instrumentation for measurement of flow velocity and mass flow rates.

The measurement of gas flows with solid particles therein (and certain fluids which behave similar thereto) is a substantial, unresolved problem in several industries —e.g., chemical processing, food handling, transport loading and unloading, filtration, aeronautics, combustion fuel fee. The state of the art is limited to complicated sample and weigh and costly in-line, real time wave energy scanning devices (ionization, x-ray, ultrasound, back-scattering, seeding with nuclear or optical emitting traces and readout by corresponding scanners). The art has also used standard fluid flow meters with a density correction on account of contained solids.

It is a principal object of the invention to provide a relatively simple, low cost (capital and operational), low maintenance, sensor of flow giving an essentially linear, analog input that is accurate and available in real time.

SUMMARY OF THE INVENTION

The object is satisfied by instrumentation utilizing triboelectric effects. A metal probe is inserted in the stream of flowing solids. Those particles in the flow which strike the probe, impart a charge transfer, due to the phenomena known collectively as the triboelectric effect. The charge which is transferred to the probe returns to earth ground through the electronics, constituting an input direct current to the electronics. The rate of charge transfer is proportional to the flow rate of solids impacting the probe.

Triboelectric monitoring has been described in U.S. Pat. No. 3,359,796 to R. C. Dimick granted Dec. 26, 1967. The industrial arts were not advanced by this disclosure because a triboelectric probe in a gas/solid stream encounters a variety of unusual conditions and problems recognized and overcome through the present invention.

In accordance with the present invention, a flow measurement instrument utilizes a triboelectric sensor probe in (or coupled to) the flow.

The current signal from the sensor probe is conducted to the electronics through an ultra low noise coaxial cable. An over voltage protector is installed at the probe to prevent voltage build up in the event of cable disconnection. The first stage of the electronics is a current to voltage conversion circuit with conversion factor adjustable from $1 \times 10^8$ V/A to $1 \times 10^{12}$ V/A in x 10 steps with 10:1 continuous adjustment. A current limiting barrier resistor is placed between the input summing junction and the remainder of the circuitry to insure that the sensing probe and cable are intrinsically safe, thus allowing the probe to be installed in hazardous areas. This safety feature forms no part of the measurement means, per se.

Since either polarity of charge transfer may occur at the probe (for different species of particles striking the probe and/or constituting the flow stream), an absolute value circuit must be employed to provide a unipolar signal. An adjustable low pass filter follows the absolute value circuit to provide damping of high frequency signal components.

Due to offset voltage and current characteristics of the current to voltage conversion circuit, the output of the circuit will vary with ambient temperature. To eliminate the temperature effect, an auto zero circuit is connected so as to re-zero the circuit periodically (about once per minute). An asymmetric timing circuit disconnects the amplifier input by energizing the input relay and connects an integrator circuit, so as to provide negative feedback to zero the current to voltage conversion circuit. The integrator maintains the zeroing level. A sample and hold circuit is used to hold the present output signal during the zeroing cycle. A time delay circuit causes the output to be held until the converter has settled after the zeroing cycle.

The 0-8 Volt output signal is converted to 4 to 20 mAmp to provide a standard instrumentation output.

A meter is provided to display the flow signal and as an aid in adjusting the instrument.

An adjustable set point relay output is also provided so that an alarm or control function can be initiated at a selected flow level. The meter is also used to set the relay set point.

Other objects, features, and advantages will be apparent from the following detailed description of preferred embodiments taken in conjunction with the accompanying drawing in which:

BRIEF DESCRIPTION OF THE DRAWING

FIGS. 1-3 are circuit diagrams for elements of the apparatus of a preferred embodiment of the invention.

DETAILED DESCRIPTION OF PREFERRED EMBODIMENTS

Figure 4:
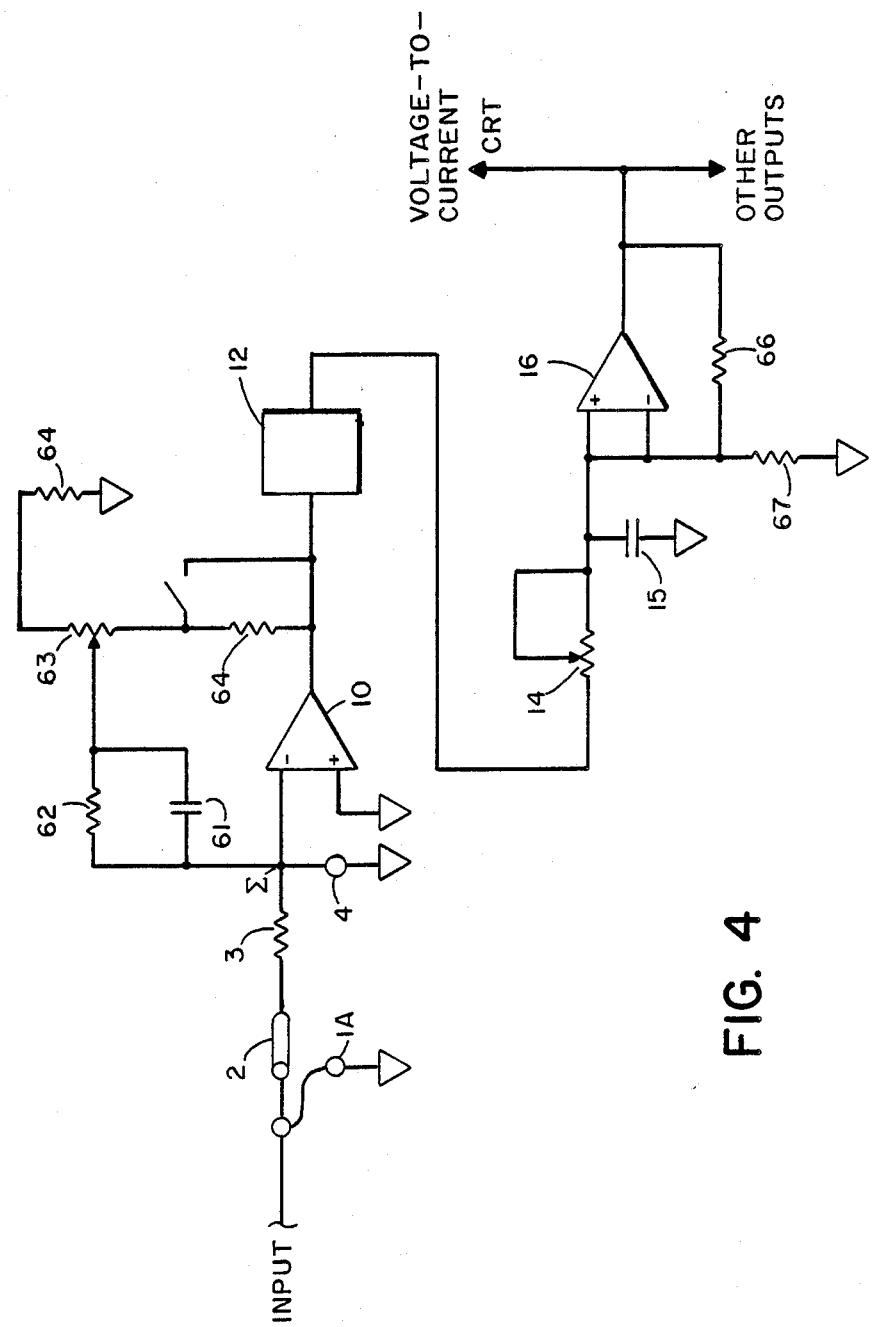
FIG. 4 is a diagram of a simplified circuit representation of the FIG. 1 apparatus.

FIG. 1 is a schematic of the electronics which amplifies and conditions the signal from a triboelectric probe 1 inserted into a flow pipe Fp. The electronics provides a standard instrumentation current output 19, and a 0 to 8 V. voltage output, drives a meter 20, and inputs a signal to a threshold circuit 21 (comprising an op amp in two stages with differential adjustment, FIG. 1A), which actuates a relay 24.

The single ended signal is directed through a low noise coaxial cable 2, a low noise current limiting resistor 3, then through a relay 5 contact closure to an op amp 10 configured as a voltage to current converter. An over voltage protection device 4 protects against excessive voltages, together with the current limiting resistors they provide an intrinsically safe network, allowing the probe to be used in hazardous areas. Over voltage devices 1A and 1B limit the maximum voltage within the probe itself.

A low noise, low drift op amp 10 directs the signal current from the probe 1 through resistor 6 and 7. This configuration produces a low output impedance signal voltage at the op amp output 8. The signal voltage equals the signal current multiplied by the effective resistance of resistor 6 whose voltage drop is modified by a voltage divider which has gain adjustment (step) means (not shown).

Since the signal current may be in either (direction), the voltage signal at op amp 10 output 8 can be either a positive or negative voltage. An absolute value circuit 12 produces a positive voltage at its output 12A equal in magnitude to the positive or negative voltage magnitude at its input 12B. FIG. 2 shows a more detailed schematic of this circuit. If a positive voltage is applied to the input 34 of op amp 35, the op amp 35 drives its output 35A positive forward biasing the diode 36, reverse biasing diode 41, and driving the input 38 of op amp 39 positive, which in turn drives the output 40 positive. Diode 41 is reversed bias. Resistors 43 and 44 provide feedback to the input of op amp 35 to cause the whole absolute valve circuit to act as a follower with a gain of +1. When the singal is a negative voltage applied to input 34, the output 35A drives negatively thereby reverse biasing diode 36 and forward biasing diode 41. Op amp 35 acts to cause the input 42 to go negatively until it equals the negative signal input. The negative voltage at input 42 causes a current through resistor 43. The input 38 of op amp 39 is held at zero volts by resistor 37, and the output 40 drives positive enough to supply the current through resistor 44 to equal the current through 43 and hold the input 45 at zero volts. Resistors 43 and 44 are equal ensuring the positive voltage at output 40 equals the negative voltage value at input 42 and also input 41— the signal input. The gain is −1. The circuit thus produces an output positive voltage equal in magnitude to the positive or negative voltage magnitude input.

Referring back to FIG. 1, the positive voltage at the absolute value circuit output 12A is directed, through switch 13, to a one pole low pass filter composed of a capacitor 15 and an adjustable resistor 14, which allows the time constant to be trimmed. A voltage follower buffer op amp 16 receives the filtered signal at node 16A and drives: a milliammeter 20 scaled to read appropriately by resistor 21; a comparator which closes relay contacts available to the user and lights a red LED when a selected threshold is exceeded; and a voltage to current converter circuit 18 suitable as an instrumentation output.

FIG. 3 is a more detailed schematic of the voltage to current circuit 18. A voltage signal 0 volts to 8 volts is input at node 46 and creates a current through resistor 47 into input 49 of op amp 51. This current is balanced by the current through resistors 61 and 48 holding input 49 at 0 volts. Op amp 51 drives its output 50 to a voltage necessary to produce the balance at input 49. The output 50 voltage is applied to a voltage divider formed by resistors 52 and 53 and the divided voltage is applied to the input 54 of op amp 55. Op amp 55 responds by turning on FET 59, driving a current through resistor 57 and the FET 59 to a point of use 60. This current increases to where the voltage across resistor 57 at the input 56 equals the voltage at input 54. The value of resistor 57 determines the current value delivered through FET 59. By varying resistor 61, its current changes and the output 50 of op amp 51 changes to maintain the current balance at input 49. By this mechanism the subsequent current output through FET 59 can be trimmed to a convenient level to represent a zero or full scale signal (4mA). As the signal at 46 goes positive, the voltage across 57 increases thereby increasing output current at 60 up to 20 mA at 8 volts.

Referring back to FIG. 1, the output of op amp 10, the input current to voltage converter, is temperature sensitive and it is automatically zeroed each minute. In FIG. 1, when switch 11 is closed the integrating amplifier 27 drives a current through resistor 26 to input 10A forcing the output 8 to zero volts. During this time the input current from the probe 1 is decoupled by input relay 5, so the integrating amplifier 27 is balancing out temperature caused offsets. The integrating amplifier 27 stores the voltage necessary to maintain the offset balancing current when switch 11 is opened and relays closes.

Relay 5 also connects the signal input to 10A during the zeroing sequence to prevent charge build-up on cable 2.

The auto zeroing would cause all the outputs to go to their zero levels. However, switch 13, resistor 14 and capacitor 15 act as a track and hold circuit. The last signal, before auto zeroing, is represented by the voltage on capacitor 15, and before the auto zero can change this voltage, switch 13 opens. This holds the voltage on capacitor 15 and the outputs to their last values while auto zeroing occurs. When auto zero is complete switch 11 opens, and, after the new signal levels are established through to the absolute value circuit output 12A, switch 13 closes. The requisite delay is formed in delay circuit 30. Timing circuit 33 provides the timing signals necessary to auto zero approximately each minute and lights a yellow LED when the auto zero is active.

A capacitively coupled probe 1P with OVP, which produces an AC signal, can be used with the aforementioned circuitry. With this probe 1P and switch, with sections 29, 32, and 17, places the auto zero function in continuous operation and directs the signal from the current to voltage converter op amp output 8 directly to the voltage to current converter 18.

The active components are, typically:
10— Burr, Brown OPA 104 CM
11/13— Harris Semiconductor HI1-200-5
16,21,27,35,39, — RCA CA3240E
51, 55— NATIONAL SEMICONDUCTOR LM1458

The passive components are, typically:
3–150k (RL20)
6–100 Meg. Ohms
7–0 to 10k
26–1 Meg.
25–100 ohms
14–0 to 1 Meg.
15–22 microfarads
37–4.7k
43–10K
44–10K
47–10K
48–10K
61–5K
52–4K
53–1K Referring now to FIG. 4, there is shown a simplified form of the circuit of FIG. 1, useable in industrial process flow monitoring conditions as a simple, low cost, but effective monitor. The parts: 1A, 2, 3, 4, 10, 11, 12, 14, 15, 16 and inputs and outputs (not shown) can be as in the FIG. 1 embodiment. In FIG. 4 one adds capicator 61 (typically 4700 picofarads, resistors: 62 (typically 100 meg-ohms), 64 (11K), 65 (100K), 66 (10K), and 67 (10K) and a 0–10K voltage divider 63. The resistor 62 provides the basic current - to - voltage conversion of the circuit. Capacitor 61 provides low frequency pass (i.e. high frequency cut-off) characteristic with a (typically)

3dB attentuation (half power point) of 0.3 hertz. The network of 63, 64, 65 provides voltage gains of from 10:1 to 100:1 of the overall conversion circuit. The resistors 66, 67 provide a voltage gain of 1.0 (and together with op amp 16 which has its own gain of 1.0, sum to 2.0 gain). The op amp 16 acts as a voltage follower buffer stage to the response time controlling circuit 14, 15 and as modified by increased gain minimizes signal level necessary at the output of op amp 10 thereby avoiding saturation.

The FIG. 4 embodiment, while limited in sensitivity range, lends itself to relative flow monitoring wherein a large triboelectric signal is available over the range to be monitored.

Figure 5:
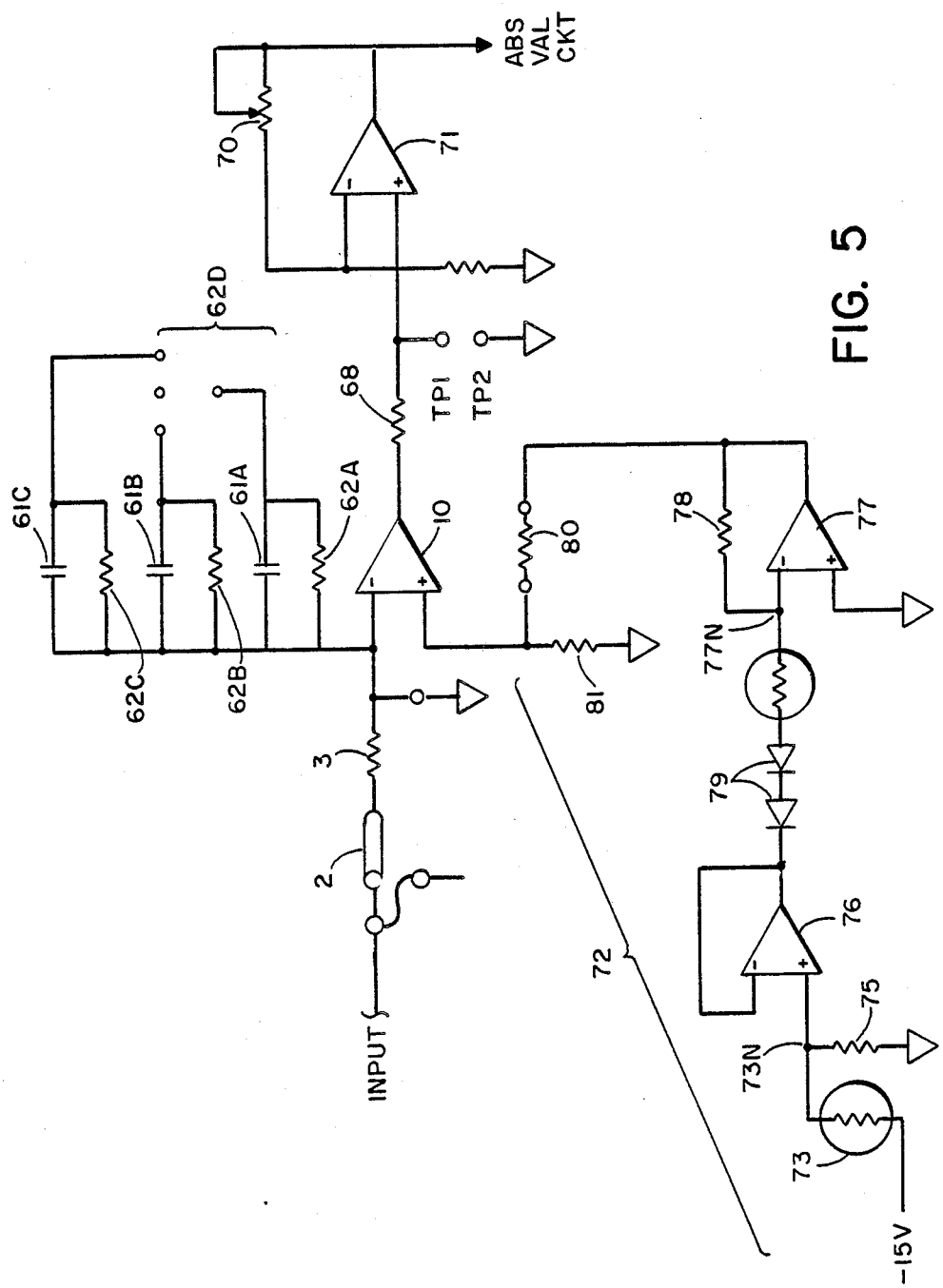
FIG. 5 is a circuit diagram of a further embodiment of the invention.

FIG. 5 shows a further embodiment affording a sensitivity range of typically $5 \times 10^{-5}$ A/V to $5 \times 10^{-11}$ A/V (six decades). The current - to - voltage conversion elements, and related frequency response control comprise resistors 62A (5 Gig-ohms), 62B (50 meg), 62 (510K), and a related switch 62D, and capacitors 61A (100 picofarads), 61B (0.01 micofarads), 61C (1.0 microfarad). The frequency response is constant on all the ranges (0.3 Hertz). An isolation resistor 68 (1K) accommodates a test point assembly TP1/TP2, useful for zeroing. A voltage gain stage is provided in a resistor 69 (1K), variable resistor 70 (1–100K) across an op amp 71 (OP77GP). A non-inverting voltage gain range of from 1:1 to 101:1 is provided. The mechanical turns counting dial of 70 is linearety correlated with the gain. The frequency circuit as a whole provides the six decade range.

A temperature compensating circuit 72 adjusts the maximum current conversion range defined at 61A, 62A, interacting with zero offset shifts of the op amp 10 inverting input and comprises thermistors 73 (Keystone AL03006-5818-97G1) and 74 (same as 73), resistor 75 (360 ohms), an Op amp 76 for voltage follower purposes, and op amp 77 for inverting current - to - voltage conversion gain (76 and 77 can be the two halves of an RCA CA3240E, or the like), feedback resistor 78 (4.7K), diode string (two 1N914's) for setting an initial thresholding to help match characteristics of op amp 10, and resistors 80 (50K–150K, selected as tailored to 10), and 81 (100 ohms). The thermistors and diodes 75 are monitored to sense temperature of 10. Thermistor 73 provides a voltage ramp with increasing temperature at node 73N. Op amp 76 provides a follower buffer. When temperature increases sufficiently to cause diodes 79 to conduct, then current is input to node 77N, which then serves as a summing junction. Thermistor 74 provides increasing current at rising temperature to provide a second order temperature compensation effect (an added exponential output following the essentially linear output of 73) and resistor 78 converts the summed current to a convenient output voltage. Typically compensation is provided over a zero to 50 degrees cent. range.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

What is claimed is:

1. Flow measuring apparatus for determining quantitatively, in a linear, analog reading, available in real time, the flow rate of a solid particle containing fluid moving in a conduit comprising, in combination,
   (a) triboelectric sensor electrode means associated with said conduit and constructed and arranged in relation to the flow stream in said conduit for a physical charge transfer from said particles in the flow to said electrode means where said charge transfer rate is proportional to said flow rate,
   (b) means for establishing a directly coupled ground path for said electrode means to conduct to ground such current as is produced at said electrode means through interaction with the flow stream including an absolute value circuit and output device,
   (c) front end means for converting said current to a voltage signal at a low frequency response, 3.0dB below 1 hertz, with a multi-decade range control, part of which is established in feedback resistor steps and part of which is established with adjustable voltage gain of respective op amps in a cascaded array, and further comprising a front end temperature compensation system for the highest sensitivity range of said range control with two negative temperature coefficient devices in cascaded array and providing upper and lower sections of a voltage/temperature ramp.

* * * * *